(12) United States Patent
Corriol et al.

(10) Patent No.: US 9,321,192 B2
(45) Date of Patent: Apr. 26, 2016

(54) PRODUCTION OF AN ARTICLE BY SELECTIVE FUSION OF POLYMER POWDER LAYERS

(75) Inventors: Cécile Corriol, Lyons (FR); Pierre-Yves Lahary, Lyons (FR)

(73) Assignee: RHODIA OPERATIONS, Paris (FR)

( * ) Notice: Subject to any disclaimer, the term of this patent is extended or adjusted under 35 U.S.C. 154(b) by 209 days.

(21) Appl. No.: 13/992,557

(22) PCT Filed: Dec. 6, 2011

(86) PCT No.: PCT/EP2011/071928
§ 371 (c)(1),
(2), (4) Date: Aug. 9, 2013

(87) PCT Pub. No.: WO2012/076528
PCT Pub. Date: Jun. 14, 2012

(65) Prior Publication Data
US 2013/0307196 A1   Nov. 21, 2013

(30) Foreign Application Priority Data

Dec. 10, 2010   (FR) ..................................... 10 60345

(51) Int. Cl.
| | | |
|---|---|---|
| *B29C 67/00* | (2006.01) | |
| *B29C 35/08* | (2006.01) | |
| *C08G 69/36* | (2006.01) | |
| *C08L 77/02* | (2006.01) | |
| *C08J 5/00* | (2006.01) | |
| *B29K 77/00* | (2006.01) | |
| *B29K 105/00* | (2006.01) | |

(52) U.S. Cl.
CPC ............. *B29C 35/08* (2013.01); *B29C 67/0077* (2013.01); *C08G 69/36* (2013.01); *C08J 5/00* (2013.01); *C08L 77/02* (2013.01); *B29K 2077/00* (2013.01); *B29K 2105/0085* (2013.01); *C08J 2377/02* (2013.01)

(58) Field of Classification Search
None
See application file for complete search history.

(56) References Cited

U.S. PATENT DOCUMENTS

| | | | |
|---|---|---|---|
| 5,959,069 A | 9/1999 | Glueck et al. | |
| 6,136,948 A | 10/2000 | Dickens, Jr. et al. | |
| 6,160,080 A | 12/2000 | Cucinella et al. | |
| 6,245,281 B1 * | 6/2001 | Scholten et al. | ............. 264/497 |
| 6,525,166 B1 | 2/2003 | Di Silvestro et al. | |
| 2004/0138363 A1 | 7/2004 | Baumann et al. | |
| 2004/0232583 A1 | 11/2004 | Monsheimer et al. | |
| 2006/0071359 A1 * | 4/2006 | Monsheimer et al. | ........ 264/113 |
| 2009/0072424 A1 | 3/2009 | Herve et al. | |
| 2010/0009189 A1 | 1/2010 | Herve | |
| 2010/0113661 A1 * | 5/2010 | Senff et al. | ..................... 524/261 |
| 2010/0270713 A1 * | 10/2010 | Frangov et al. | ................ 264/497 |
| 2011/0052927 A1 * | 3/2011 | Martinoni et al. | ......... 428/474.7 |
| 2011/0172387 A1 * | 7/2011 | Filou et al. | .................... 528/325 |
| 2011/0293918 A1 | 12/2011 | Lucas et al. | |

FOREIGN PATENT DOCUMENTS

| | | |
|---|---|---|
| EP | 0 682 057 A1 | 11/1995 |
| EP | 0 632 703 B1 | 2/1999 |
| EP | 0 832 149 B1 | 7/2000 |
| EP | 1 015 214 B1 | 7/2002 |
| EP | 1 459 871 A2 | 9/2004 |
| EP | 1 797 141 B1 | 8/2008 |
| FR | 2 743 077 A1 | 7/1997 |
| FR | 2 779 730 A1 | 12/1999 |
| WO | 96/06881 A2 | 3/1996 |
| WO | 01/38061 A1 | 5/2001 |
| WO | 2007/115977 A1 | 10/2007 |
| WO | 2010/063691 A2 | 6/2010 |

OTHER PUBLICATIONS

International Search Report issued on Jan. 24, 2012, by the European Patent Office as the International Searching Authority in corresponding International Application No. PCT/EP2011/071928.

\* cited by examiner

*Primary Examiner* — Mary F Theisen

(57) ABSTRACT

A process is described for manufacturing articles by selective fusion of polymer powder layers, especially the rapid prototyping by solid-phase laser sintering of a powder based on a copolyamide of type 6 having a low enthalpy of cold crystallization. Further described, are the articles obtained by such a process.

16 Claims, 2 Drawing Sheets

Figure 1: Determination of enthalpy (ΔHcc) and temperatures of cold crystallization (Ticc, Tfcc)

PRODUCTION OF AN ARTICLE BY SELECTIVE FUSION OF POLYMER POWDER LAYERS

CROSS-REFERENCE TO PRIOR APPLICATIONS

This application is a National Stage of PCT/EP2011/071928, filed Dec. 6, 2011, and designating the United States (published in French on Jun. 14, 2012, as WO 2012/076528 A1), which claims priority under 35 U.S.C. §119 to FR 1060345, filed Dec. 10, 2010, each hereby expressly incorporated by reference in its entirety and each assigned to the assignee hereof.

The present invention relates to a method for manufacturing articles by selective fusion of polymer powder layers, more particularly rapid prototyping by solid-phase sintering, with a laser, of a powder based on copolyamide 6 having a low enthalpy of cold crystallization. The invention also relates to articles obtained by such a method.

PRIOR ART

The method for manufacturing articles by selective fusion of polymer powder layers is a method which allows components with complex shapes to be obtained without tooling and without machining, from a three-dimensional image of the article to be produced, by sintering superposed layers of polymeric powders, especially by means of a laser. This is generally done using thermoplastic polymers. General aspects of rapid prototyping by laser sintering are referred to in U.S. Pat. No. 6,136,948 and in patent applications WO 96/06881 and US20040138363. The technology of agglomerating polyamide powders under electromagnetic radiation is used to manufacture three-dimensional objects for diverse applications, especially prototypes and models.

In a method for manufacturing articles by selective fusion of polyamide powder layers, a layer of polyamide powder is laid down on a horizontal plate maintained in a chamber heated to a temperature between the crystallization temperature Tc and the melting temperature Tf of the polyamide powder. Electromagnetic radiation, especially a laser, then agglomerates powder particles of the powder layer by means of a computer whose memory contains the shape of the object and reproduces this shape in the form of slices. A new layer of powder is then laid down, and the laser agglomerates the powder particles according to a geometry corresponding to this new slice of the object, and so on. The procedure is repeated until the entire object has been manufactured.

In order to produce polyamide articles by such methods, it is known practice to use powders based on polyamide 11 or 12 that have a low d50 particle size, especially of between 50 and 150 μm. These powders have particles with similar sizes and thus a narrow particle size distribution.

It is known practice to use polyamides 11 and 12 having as large as possible a |Tf−Tc| difference, in order to benefit from a wide working window. This working window is defined by its upper temperature limit and its lower temperature limit. The upper limit of the working window corresponds to the melting temperature Tf at which agglomeration or caking occurs. The lower limit of the working window corresponds to the crystallization temperature Tc at which distortion, deformation, or "curling" develops. This working window of the device is an important parameter for the manufacture of articles based on polyamides 11 and 12 that can be found on the market at present.

However, this parameter for monitoring is not the only one with regard to polyamides 6 for obtaining suitable articles produced by the methods of manufacture by selective fusion of powder layers. The reason is that a high working window |Tf−Tc| does not prevent the appearance of surface defects on the powder bed during each application of a new layer of powder in the case of polyamides 6, a phenomenon which is conventionally observed little or not at all in polyamides 11 and 12. Moreover, there has hitherto been no polyamide 6-based powder on the market that is ideally suited to the manufacture of articles by these methods of manufacture by selective fusion of powder layers.

INVENTION

The applicant company has now found that another parameter important in the production of articles by selective fusion of polyamide 6 powder layers lies in the monitoring of the enthalpy of cold crystallization of these polyamides in order to prevent the presence of cracks and/or lumps at the surface of the powder bed during manufacture of articles.

The reason is that it is apparently important that the polyamides suitable for the production of articles by selective fusion of powder layers have a low enthalpy of cold crystallization. The phenomenon of cold crystallization is, moreover, well known in the polyamide field, and corresponds to an exothermic process resulting from the rearrangement of the amorphous zones of the material into crystalline zones. Cold crystallization occurs at a temperature lower than the melting temperature of the polymer. It is demonstrated by DSC (Differential Scanning Calorimetry) measurements under standard or modulated conditions, and corresponds to an exothermic peak appearing before the endothermic melting peak. Under standard conditions of DSC measurement, the exotherm of the cold crystallization may be masked entirely or partially by the other phenomena, such as melting, for example. Modulated DSC, in contrast, allows separation of the reversible phenomena from the irreversible phenomena by application of a signal which is sinusoidal in temperature. Modulated DSC in effect makes it possible to separate the total heat flow into its thermodynamic and kinetic components. The phenomenon of cold crystallization then appears as an irreversible phenomenon (kinetic component of the total signal) and is therefore separated from the melting.

The applicant company has now developed a semiaromatic and/or semicycloaliphatic copolyamide 6 which has a low enthalpy and is extremely well suited to the methods of producing articles by selective fusion of powder layers.

The present invention accordingly first provides for the use of a powder comprising at least one copolyamide having an enthalpy of cold crystallization of less than 80 J/g as measured by protocol P for the manufacture of an article by selective fusion of layers;

the copolyamide comprises at least 80 mol % of caprolactam monomer or the corresponding amino acid, based on the number of moles of the total mixture of monomers and comonomers, and at least one aromatic or cycloaliphatic comonomer; and the process P involves measuring the enthalpy of cold crystallization by modulated differential calorimetry analysis wherein:

a) the copolyamide is first held at a temperature of 25° C. for 5 minutes, b) a modulated rise in temperature is then performed to 250° C. at a rate of 3° C./min with a sinusoidal amplitude of 0.48° C. and a period of 1 minute, and the signal is recorded, c) the area of the exothermic peak ΔHcc is measured, corresponding to the enthalpy of cold crystallization of the copolyamide, as observed in FIG. 1, especially by means of processing software.

Preference is given especially to using a copolyamide having an enthalpy of cold crystallization of less than 70 J/g as measured by protocol P, more preferably less than 60 J/g.

The present invention also relates to a method for manufacturing an article by selective fusion of layers, especially by rapid prototyping using a laser, using a powder as defined above. The invention also relates to an article manufactured by selective fusion of layers as defined above.

DETAILED DESCRIPTION OF THE INVENTION

Figure 1:
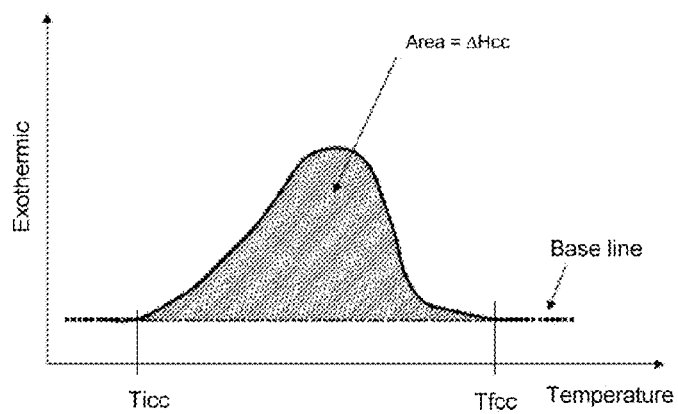
FIG. 1 shows a plot of crystallization exotherm versus cold crystallization temperature that illustrates determination of enthalpy of cold crystallization (ΔHcc).

A copolyamide in the sense of the invention is a compound obtained by polymerizing at least one constituent monomer of the polyamide and at least one, or two or more, comonomer (s). The copolyamides of the present invention are preferably semicrystalline.

A comonomer, also called minority comonomer, is a compound which is different from the constituent monomer of the polyamide and is capable of bonding covalently to the constituent monomers of the polyamide, especially by amide, ester, or imide bonds, to form a copolyamide.

The aromatic and/or cycloaliphatic comonomers of the invention preferably have at least one function selected from the group consisting of:
an amine function Am, capable in particular of forming an amide bond with a carboxylic acid function of the constituent monomer of the polyamide;
a carboxylic acid function Ac, capable in particular of forming an amide bond with an amine function of the constituent monomer of the polyamide;
an alcohol function OH, capable in particular of forming an ester bond with a carboxylic acid function of the constituent monomer of the polyamide; and
a dicarboxylic acid function DA, capable in particular of forming an imide bond with an amine function of the constituent monomer of the polyamide. This dicarboxylic acid function may comprise the carboxylic acid functions geminal or on vicinal carbon atoms.

The amine function Am is preferably a primary amine function or salt thereof. The carboxylic acid function may be in salified form or not.

The comonomer is preferably represented by the formula (I) below:

$$R(Am)_w\text{-}(Ac)_x(OH)_y(DA)_z \qquad (I)$$

in which:

R is a linear, branched, aliphatic, aromatic, or cycloaliphatic hydrocarbon radical comprising optionally from 1 to 20 carbon atoms and comprising optionally heteroatoms such as N, O, or P;
w is between 0 and 4;
x is between 0 and 4;
y is between 0 and 4;
z is between 0 and 4; and
w+x+y+z is greater than or equal to 1, especially between 1 and 5.

The comonomers may be selected from the group consisting of:
amino acids or aminocarboxylic acids, comprising for example from 3 to 18 carbon atoms; or lactams, comprising for example from 3 to 18 carbon atoms;
diamines, which may be aliphatic, aromatic, or cycloaliphatic and which preferably comprise from 3 to 18 carbon atoms;
diacids, which may be aliphatic, aromatic, or cycloaliphatic, and which preferably comprise from 3 to 18 carbon atoms;
monoacid or monoamine compounds, which are generally used as chain transfer agents for polyamide;
hydroxy acids or derivatives, comprising for example, preferably, from 3 to 18 carbon atoms;
lactones, comprising for example from 3 to 18 carbon atoms;
diols, which may be aliphatic or cycloaliphatic and which comprise preferably from 3 to 18 carbon atoms;
monomers comprising two carboxylic acid functions, allowing the formation of aliphatic, aromatic, or cycloaliphatic imide functions, and comprising from 3 to 18 carbon atoms;
or mixtures thereof.

Examples of aliphatic comonomers include those selected from the group consisting of the following: 11-aminoundecanoic acid, 12-aminododecanoic acid, lauryllactam, sebacic acid, dodecanedioic acid, tetramethylenediamine, trimethylhexamethylenediamine, adipic acid, hexamethylenediamine, oxalic acid, fumaric acid, maleic acid, methylglutaric acid, ethylsuccinic acid, meta-xylylenediamine, para-xylylenediamine, 1-methylpentamethylenediamine, fatty acids such as lauric acid, stearic acid, palmitic acid, benzylic acid, 1-naphthylacetic acid, 3-(3,5-di-tert-butyl-4-hydroxyphenyl)propionic acid, benzylamine, laurylamine, 1-naphthalenemethylamine, octanol, 2-ethylhexanol, ethylene glycol, 1,2-propanediol, 1,3-propanediol, 1,4-butanediol, ethanolamine, propanolamine, lactic acid, glycolic acid, caprolactone, butyrolactone, propionolactone, 3-hydroxybutyric acid, 3-hydroxyvaleric acid, 2,2,6,6-tetra(β-carboxyethyl)cyclohexanone, diaminopropane-N,N,N',N'-tetraacetic acid, malic acid, tartaric acid, citric acid, aspartic acid, glutamic acid, and dipentaerythritol.

The copolyamide in the sense of the invention therefore comprises at least one comonomer, at least one such comonomer being an aromatic or cycloaliphatic comonomer. The copolyamide may comprise a mixture of an aromatic comonomer and a cycloaliphatic comonomer.

An aromatic comonomer is a comonomer comprising at least one aromatic ring and optionally one or more linear or branched hydrocarbon chains. The copolyamide according to the invention may comprise at least one minority aromatic comonomer, such as, for example, those selected from the group consisting of the following: terephthalic acid, isophthalic acid, benzoic acid, phenylenediamine, 1-naphthoic acid, anthracene-9-carboxylic acid, aniline, naphthylamine, 1,8-naphthalenedicarboxylic acid, 2,6-naphthalenedicarboxylic acid, 5-hydroxyisophthalic acid, 5-sulfoisophthalic acid, 2,3-diaminonaphthalene, 1,5-diaminonaphthalene, 4-aminobenzoic acid, 4-hydroxybenzoic acid, 1-hydroxy-2-naphthoic acid, 3-hydroxy-2-naphthoic acid, 4,4'-diaminodiphenylmethane acid, 4-aminophenyl ether, trimesic acids, trimellitic acid, pyromellitic acid, 3,4,9,10-perylenetetracarboxylic acid, 5-aminoisophthalic acid, 3,5-diaminobenzoic acid, hydroquinone, resorcinol, bisphenol A, 4,4'-oxydiphenol, and tetrahydrophthalic anhydride.

A cycloaliphatic comonomer is a comonomer comprising at least one aliphatic ring and optionally one or more linear or branched hydrocarbon chains. The copolyamide according to the invention may comprise at least one minority cycloaliphatic comonomer, such as, for example, those selected from the group consisting of the following: isophoronediamine, bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane, p-bis(aminocyclohexyl)methane, and isopropylidenedi(cyclohexylamine), 1,4-dicarboxycyclohexane, 4,4'-diamino-3,3'-dimethyldicyclohexylmethane, 1,4-diaminocyclohexane, hexahydroterephthalic acid, 4-amino-2,2,6,6-tetramethylpiperidine (TAD), piperazine, N-(2-aminoethyl)piperazine, N,N'-bis(2-aminoethyl)piperazine, 1,2-diaminocyclohexane, N,N'-bis(2-aminoethyl)imidazolidone, N-(2-hydroxyethyl)piperazine, isosorbide, isomannide, 1,4-cyclohexanediol, N,N'-bis(2-hydroxyethyl)imidazolidone, 4-amino-1-cyclohexanecarboxylic acid, and trans-1,2-diaminocyclohexane-N,N,N',N'-tetraacetic acid.

The copolyamide may also be a polymer comprising star macromolecular chains such as those described in documents FR2743077, FR2779730, U.S. Pat. No. 5,959,069, EP632703, EP682057, and EP832149. These compounds are known as having enhanced fluidity relative to linear polyamides with the same molecular mass.

A special preference is given to copolyamides comprising a mixture of cycloaliphatic diamine and aromatic diacid as minority comonomers.

As an example of copolyamides according to the invention, mention may be made in particular of the following:
  a copolyamide 6 comprising 4.7 mol % of a mixture of terephthalic acid and a diamine, especially isophoronediamine;
  a copolyamide 6 comprising 0.37 mol % of a mixture of isophthalic acid and a diamine, especially isophoronediamine;
  a copolyamide 6 comprising 2 mol % of a mixture of terephthalic acid and hexamethylenediamine;
  a copolyamide 6 comprising 13 mol % of a mixture of isophthalic acid and hexamethylenediamine;
  a copolyamide 6 comprising 5 mol % of a mixture of adipic acid and isophoronediamine; and
  a copolyamide 6 comprising 2 mol % of a mixture of sebacic acid and isophoronediamine.

The copolyamides may be manufactured conventionally by polymerization, more particularly by continuous or batchwise polymerization.

Protocol P may be carried out with a conventional DSC (Differential Scanning calorimetry) instrument. Such DSC characterization is employed simply and reproducibly and allows calorimetric analysis of the copolyamides, providing qualitative and quantitative information on the physical and chemical transformations which bring about endothermic or exothermic heat exchange, or variations in calorific capacity.

It is entirely possible to demonstrate copolyamides 6 of the present invention having an enthalpy of cold crystallization of less than 80 J/g as measured by protocol P, by using different aromatic and/or cycloaliphatic comonomers and by subsequently subjecting said copolyamides to calorimetric study, on the basis in particular of a series of conventional and routine tests, for implementation of protocol P.

Protocol P is preferably the protocol described below, comprising 4 steps:

1. Deployment of the instrument
   Instrument used: Q2000, TA Instruments.
   Power up the instrument and leave to equilibrate for at least 30 minutes.
   Calibrate the instrument in accordance with the instrument manufacturer recommendations.
   The nitrogen used is of analytical grade. It will be used for all of the measurements, in accordance with the instrument manufacturer recommendations.

2. Placement of the sample in the crucible and handling of the crucibles
   Weigh two crucibles with their lid: a first crucible, in which the sample will be placed, and a second crucible, which will be used as a reference.
   Place between 2 and 5 g of material in the first crucible. The accuracy of the weighing must be ±0.1 mg.
   Close the two crucibles with their lid, using a crimping device.
   Make sure that the outside of the two crucibles is clean.
   Install the crucibles in the cells of the calorimeter, using tongs.
   Close the lid of the sample holder and the lid of the cell containing the reference.

3. Measurement of enthalpy of cold crystallization by modulated differential calorimetry analysis
   Parameterize the modulation of the rise and fall in temperature:
     Sinusoidal amplitude: 0.48° C.
     Period: 1 min
   Carry out a first isotherm of 5 minutes at 25° C. to stabilize the modulation
   Carry out a temperature ramp to 250° C., at a rate of 3° C./min.
   Carry out a cooling cycle to 25° C., at a rate of 3° C./min, and record the results.
   Open the sample holder. Remove the crucible containing the sample and ensure that it has not suffered deformation and/or deterioration. If that is the case, discard the measurement and carry out a second measurement.

4. Determination of the enthalpy and the width of the peak of cold crystallization
   In the TA Universal Analysis 2000 data processing software:
   Label the peak corresponding to the first temperature rise and to the irreversible phenomena ("non-reversing heat flow"). The exothermic peak which appears corresponds to the cold crystallization of the material.
   Construct the base line of the peak which joins the two points at which the peak "detaches" from the base line (see FIG. 1).
   Measure:
     The initial temperature of the cold crystallization (Ticc)
     The final temperature of the cold crystallization (Tfcc)
   The area of the zone between the summit of the peak and the base line constructed as described above:
     The width of the cold crystallization peak is given by: Tfcc−Ticc (in ° C.).
   The enthalpy of cold crystallization $\Delta Hcc$ in joules/gram is given directly by the data processing software from the area A calculated as in FIG. 1.

A powder is an assembly of polyamide particles which is obtained by a variety of possible methods. The powder according to the invention may be obtained in a variety of ways known to the skilled person, depending on the materials used, such as by grinding, cryogrinding, by polymerization or by precipitation. Mention may be made in particular, for example, of documents EP1797141, WO2007/115977, and WO2010/063691.

Said powder may especially be manufactured by:
a) melt-mixing a copolyamide with a compound A consisting of a polymeric material comprising at least one part of its structure that is compatible with said copolyamide and at least one part of its structure that is not compatible and is insoluble in said copolyamide, to give a dispersion of discrete particles of copolyamide;
b) cooling this mixture to a temperature lower than the softening temperature of the copolyamide; and
c) treating this cooled mixture to bring about the disintegration of the copolyamide particles.

Formation of the mixture is obtained in particular by melting the copolyamide and adding the compound A in solid or melted form, and applying a mixing energy to obtain formation of the discrete particles of copolyamide dispersed in an advantageously continuous phase formed by the compound A. This mixture may also be obtained by mixing particles of said copolyamide and particles of said additive A, in the solid state, and melting the mixture of particles, with application of a mixing energy to the melted mixture, to obtain the formation of discrete particles of copolyamides dispersed in an advantageously continuous phase formed by the compound A.

The powder may comprise a ponderal copolyamide content of between 50% and 90%, more particularly between 70% and 80%.

The ponderal concentration of additive A in the mixture may be between 10% and 50%, advantageously between 20% and 30%. As a reminder, the end points are included in the ranges presented.

According to one embodiment, said powder consists of copolyamide and additive A, and also optionally:
at least one, more particularly one, compound B as defined below, and/or
one or more additives or compounds as defined below.

More generally, the mixture may be obtained by any suitable device such as endless screw mixers or agitator-mixers which are compatible with the temperature and pressure conditions employed for the use of the copolyamides. According to one preferred embodiment of the invention, the melted mixture is shaped before the cooling step, in the form of filaments or rods, for example. This shaping may advantageously be carried out by a method of extrusion through a die. According to one preferred embodiment of the invention, especially when the melted mixture is shaped, this melted mixture is preferably produced in an extruder which feeds the extrusion die.

The melted mixture may be cooled by any appropriate means. Among such means, air cooling or immersion in a liquid are preferred.

The step of recovering the copolyamide powder is advantageously a step of disintegration treatment of the discrete copolyamide particles. This disintegration may be obtained by applying a shearing force to the cooled mixture. Disintegration of the copolyamide particles may also be obtained by immersing the cooled melted mixture in a liquid which is a nonsolvent for the thermoplastic polymer and advantageously a solvent for the additive A.

Additive A is advantageously a block, sequence, comb, hyperbranched, or star polymer. Accordingly, the structure that is compatible with the polyamide forms a block, sequence, skeleton, or comb teeth, the core or the branches of the star or hyperbranched polymer. According to one preferred embodiment of the invention, the structure that is compatible in the additive A comprises functions chemically identical to those of copolyamide. As additive A, preference is given to using compounds selected from the group including the following: block copolymers of ethylene oxide and propylene oxide (Pluronic® and Synperonic®), and polyalkylene amines (Jeffamine®).

The composition, besides the copolyamide and additive A, may comprise other compounds.

Additive A may be used in combination with a compound B which is insoluble in and not compatible with the copolyamide. This compound B advantageously has a chemical structure that is compatible with at least part of the structure of the compound A, especially the structural part that is not compatible with the copolyamide. Examples of compounds B that are suitable for the invention include the compounds belonging to the classes of polysaccharides, polyoxyalkylene glycols, and polyolefins. Compound B may be added separately from compound A or in the form of a mixture with at least part of the compound A.

It may also be premixed with the thermoplastic polymer.

This method enables particles to be obtained that have a controlled geometry, in particular by adjustment of the stirring during step a), the nature of the compounds A and/or B, or the temperature and concentration of the various components of the mixture.

The powder according to the invention may in particular have one or more of the following features:
a d50 particle size distribution of between 20 and 100 µm, preferably between 30 and 70 µm, and also fulfilling the following relation: (d90-d10)/d50 of between 0.85-1.3, preferably 0.9-1.2;
a sphericity factor of between 0.8 and 1, preferably between 0.85 and 1;
an intraparticular porosity of less than 0.05 ml/g, preferably less than 0.02 ml/g, especially for pore sizes of greater than or equal to 0.01 µm.

The d50 particle size distribution, sphericity factor, and intraparticular porosity are defined in particular in patent application WO2010/063691.

The compositions used according to the invention, the powders and/or the articles obtained, may comprise one or more additives or compounds selected from the group consisting of matting agents, heat stabilizers, light stabilizers, pigments, dyes, reinforcing fillers, such as glass fibers or mineral fibers, glass beads, and carbon fibers, nucleating agents, and impact strength agents such as elastomers, various metals, and anticaking agents such as silica.

Manufacturing by selective fusion of layers is a method for manufacturing articles that comprises laying down layers of materials in powder form, selectively melting a portion or a region of a layer, and laying down a new layer of powder, and again melting a portion of this layer, and so on, so as to give the desired object. The selectivity of the portion of the layer to be melted is obtained by means, for example, of the use of absorbers, inhibitors, or masks, or via the input of focused energy, as for example electromagnetic radiation such as a laser beam.

Preference is given in particular to sintering by addition of layers, especially rapid prototyping by sintering using a laser.

Rapid prototyping is a method for obtaining components in complex shapes without tooling and without machining, from a three-dimensional image of the article to be produced, by sintering superposed layers of powders by means of a laser. General aspects of rapid prototyping by laser sintering are referred to in U.S. Pat. No. 6,136,948 and in patent applications WO 96/06881 and US20040138363.

Machines for carrying out these methods are composed of a construction chamber on a production piston, surrounded on the left and on the right by two pistons which supply the powder, a laser, and means for spreading the powder, such as a roller. The chamber is generally maintained at constant temperature to avoid deformations.

As an example, the powder is first spread in a uniform layer over the entire chamber, and the laser then traces the 2D cross section on the surface of the powder, thereby sintering it. Masks may also be used. The production piston drops by the thickness of one layer, while one of the powder feed pistons rises. A new layer of powder is spread over the whole surface, and the procedure is repeated until the component is finished. The component must then be withdrawn cautiously from the machine and cleaned to remove the unsintered powder surrounding it. There are other machines where the powder arrives not from the bottom, using pistons, but from the top. This method provides a time saving since there is no need to halt the manufacture of components in order to resupply the machine with powder.

Other methods of manufacture by addition of layers, such as those described in patents WO 01/38061 and EP1015214, are also suitable. These two methods use infrared heating to melt the powder. The selectivity of the melted portions is obtained by the use of inhibitors in the case of the first method and by the use of a mask in the case of the second method. Another method is described in patent application DE10311438. In this method, the energy for melting the polymer is provided by a microwave generator and the selectivity is obtained through the use of a "susceptor".

A specific language is used in the description so as to aid comprehension of the principle of the invention. Nevertheless, it should be understood that no limitation of the scope of the invention is envisioned by the use of this specific language. Modifications and improvements can in particular be envisaged by a person conversant with the technical field concerned on the basis of his own general knowledge.

The term "and/or" includes the meanings "and" and "or" and all the other possible combinations of elements connected with this term.

Other details or advantages of the invention will become more clearly apparent in the light of the examples given below purely by way of indication.

EXPERIMENTAL SECTION

The materials used are as follows:
Copolyamide 6 comprising 4.7 mol % of a mixture of 50% by weight of terephthalic acid and 50% by weight of isophoronediamine; relative viscosity 130 mg/l in formic acid. This polyamide has an enthalpy of cold crystallization by protocol P of 58 J/g. The powder obtained has a D50 distribution of 48.5 μm and a particle size scatter ((D90-D10)/D50) of 1.2.
Homopolyamide K122, sold by DSM, with a relative viscosity of 124 cm$^3$/g in accordance with standards ISO 307, 1157, and 1628. This homopolyamide 6 has an enthalpy of cold crystallization by protocol P of 98 J/g. The powder obtained has a D50 distribution of 44.8 μm and a particle size scatter ((D90-D10)/D50) of 1.25.

These powders were mixed homogeneously with 0.2% by weight of precipitated silica before entering the rapid prototyping machine. A heat stabilizer is added to the washed rods during the manufacturing process.

Example 1

Manufacture of an Article by Laser Sintering

The powders are sintered in a laser prototyping machine sold by 3D Systems. The particles are placed in two adjacent trays on the working surface and are heated to a temperature of 150° C. The particles are transferred to the working surface using a roller, in a 100-150 microns layer. The working surface is heated at a temperature of between 195 and 210° C. A laser with a power of between 39 and 46 W provides the additional energy necessary for the sintering of the particles.

When the first layer has been sintered, the working surface is lowered and the roller then lays down a second layer of powder on the working surface, and so on, until the final article is obtained.

Figure 2:
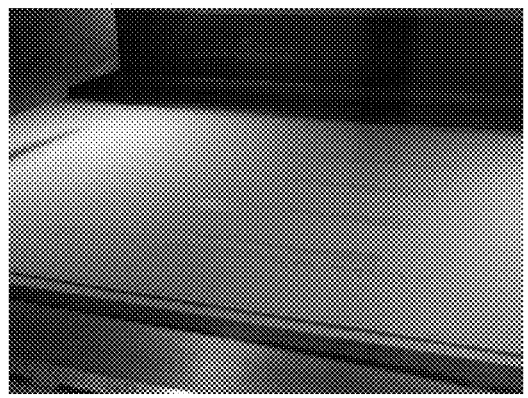
FIG. 2 is a photograph showing the surface of a powder bed of homopolyamide 6 having an enthalpy of cold crystallization by protocol "P", as described in the present specification, of 98 J/g.
Figure 3:
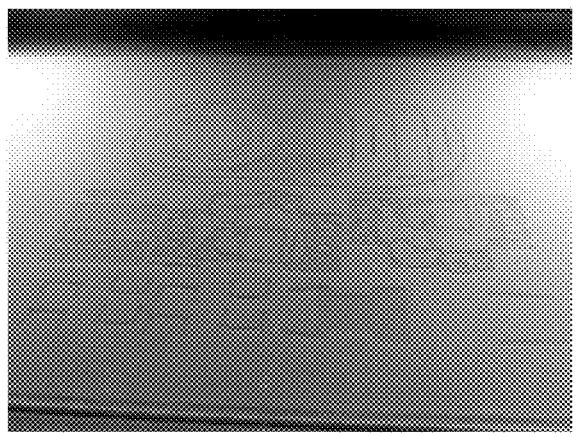
FIG. 3 is a photograph showing the surface of the powder bed according to the present invention having an enthalpy of cold crystallization by protocol "P", as described in the present specification, of 58 J/g.
Figure 4:
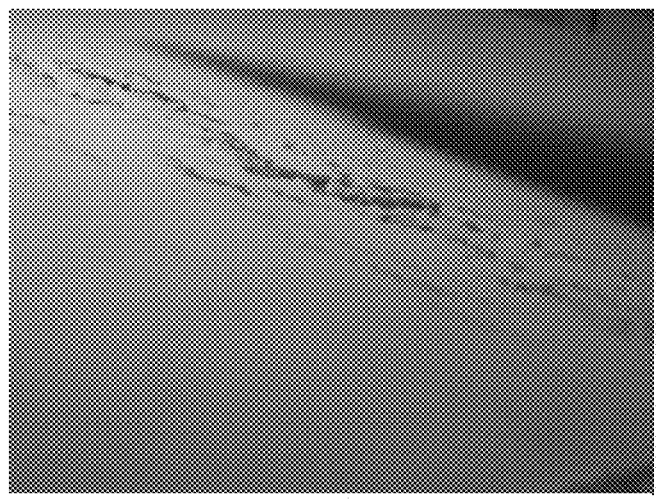
FIG. 4 is a photograph showing a magnified view of the surface of the powder bed shown in FIG. 4.

The surface of the powder bed is then observed, and it exhibits cracks, lumps, and crusts which prevent any manufacture of articles obtained with the homopolyamide 6 having an enthalpy of cold crystallization by protocol P of 98 J/g (see FIG. 2). This is also shown in FIG. 4 with a greater magnification. In contrast, no defect in appearance is observed at the surface of the powder bed according to the present invention having an enthalpy of cold crystallization by protocol P of 58 J/g (see FIG. 3).

The invention claimed is:

1. A method of manufacturing an article, the method comprising manufacturing the article by selective fusion of layers using a powder comprising at least one copolyamide having an enthalpy of cold crystallization of less than 80 J/g, as measured by protocol P;
   wherein the at least one copolyamide comprises at least 80 mol % of caprolactam monomer or the corresponding amino acid, based on the number of moles of the total mixture of monomers and comonomers, and at least one aromatic or cycloaliphatic comonomer; and
   wherein the protocol P involves measuring the enthalpy of cold crystallization by modulated differential calorimetry analysis that comprises:
   a) first holding the copolyamide at a temperature of 25° C. for 5 minutes,
   b) performing a modulated rise in temperature to 250° C. at a rate of 3° C./min with a sinusoidal amplitude of 0.48° C. and a period of 1 minute, and recording a signal, and
   c) measuring an area of exothermic peak $\Delta H_{cc}$, corresponding to the enthalpy of cold crystallization of the copolyamide.

2. The method as defined by claim 1, wherein the aromatic or cycloaliphatic comonomer of the copolyamide has at least one function selected from the group consisting of:
   an amine function Am, that can form an amide bond with a carboxylic acid function of the constituent monomer of the polyamide;
   a carboxylic acid function Ac, that can form an amide bond with an amine function of the constituent monomer of the polyamide;
   an alcohol function OH, that can form an ester bond with a carboxylic acid function of the constituent monomer of the polyamide; and
   a dicarboxylic acid function DA, that can form an imide bond with an amine function of the constituent monomer of the polyamide.

3. The method as defined by claim 2, wherein the comonomer is represented by the formula (I) below:

$$R(Am)_w\text{-}(Ac)_x(OH)_y(DA)_z \qquad (I)$$

in which:
R is a linear, branched, aliphatic, aromatic, or cycloaliphatic hydrocarbon radical;
w is between 0 and 4;
x is between 0 and 4;
y is between 0 and 4;
z is between 0 and 4; and
w+x+y+z is greater than or equal to 1.

4. The method as defined by claim 1, wherein the comonomer is selected from the group consisting of:
amino acids or aminocarboxylic acids, or lactams;
diamines;
diacids;
monoacid or monoamine compounds;
hydroxy acids;
lactones;
diols; and
monomers comprising two carboxylic acid functions, allowing formation of aliphatic, aromatic, or cycloaliphatic imide functions.

5. The method as defined by claim 1, wherein the aromatic comonomer is selected from the group consisting of: terephthalic acid, isophthalic acid, benzoic acid, phenylenediamine, 1-naphthoic acid, anthracene-9-carboxylic acid, aniline, naphthylamine, 1,8-naphthalenedicarboxylic acid, 2,6-naphthalenedicarboxylic acid, 5-hydroxyisophthalic acid, 5-sulfoisophthalic acid, 2,3-diaminonaphthalene, 1,5-diaminonaphthalene, 4-aminobenzoic acid, 4-hydroxybenzoic acid, 1-hydroxy-2-naphthoic acid, 3-hydroxy-2-naphthoic acid, 4,4'-diaminodiphenylmethane acid, 4-aminophenyl ether, trimesic acids, trimellitic acid, pyromellitic acid, 3,4,9,10-perylenetetracarboxylic acid, 5-aminoisophthalic acid, 3,5-diaminobenzoic acid, hydroquinone, resorcinol, bisphenol A, 4,4'-oxydiphenol, and tetrahydrophthalic anhydride.

6. The method as defined by claim 1, wherein the cycloaliphatic comonomer is selected from the group consisting of: isophoronediamine, bis(3,5-dialkyl-4-aminocyclohexyl)methane, bis(3,5-dialkyl-4-aminocyclohexyl)ethane, bis(3,5-dialkyl-4-aminocyclohexyl) propane, bis(3,5-dialkyl-4-aminocyclohexyl) butane, bis(3-methyl-4-aminocyclohexyl)methane, p-bis(aminocyclohexyl)methane, and isopropylidenedi(cyclohexylamine), 1,4-dicarboxycyclohexane, 4,4'-diamino-3,3'-dimethyldicyclohexylmethane, 1,4-diaminocyclohexane, hexahydroterephthalic acid, 4-amino-2,2,6,6-tetramethylpiperidine (TAD), piperazine, N-(2-aminoethyl)piperazine, N,N'-bis(2-aminoethyl)piperazine, 1,2-diaminocyclohexane, N,N'-bis(2-aminoethyl)imidazolidone, N-(2-hydroxyethyl)piperazine, isosorbide, isomannide, 1,4-cyclohexanediol, N,N'-bis(2-hydroxyethyl)imidazolidone, 4-amino-1-cyclohexanecarboxylic acid, and trans-1,2-diaminocyclohexane-N,N,N',N'-tetraacetic acid.

7. The method as defined by claim 1, wherein the powder is produced by:
a) melt-mixing the copolyamide with a compound A consisting of a polymeric material comprising at least one part of its structure that is compatible with said copolyamide and at least one part of its structure that is not compatible and is insoluble in said copolyamide, to give a dispersion of discrete particles of copolyamide;
b) cooling this mixture to a temperature lower than the softening temperature of the copolyamide; and
c) treating this cooled mixture to bring about the disintegration of the copolyamide particles.

8. The method as defined by claim 1, wherein the powder has one or more of the following features:
a d50 particle size distribution of between 20 μm and 100 μm and also fulfilling the following relation: (d90−d10)/d50 of between 0.85-1.3;
a sphericity factor of between 0.8 and 1; and
an intraparticular porosity of less than 0.05 ml/g, especially for pore sizes of greater than or equal to 0.01 μm.

9. An article manufactured by the method as defined by claim 1.

10. The method as defined by claim 4, wherein the diamines are aliphatic, aromatic, or cycloaliphatic.

11. The method as defined by claim 4, wherein the diacids are aliphatic, aromatic, or cycloaliphatic.

12. The method as defined by claim 4, wherein the diols are aliphatic or cycloaliphatic.

13. The method as defined by claim 8, wherein the d50 particle size distribution is between 30 and 70 μm.

14. The method as defined by claim 8, wherein the relation (d90−d10)/d50 is 0.9-1.2.

15. The method as defined by claim 8, wherein the sphericity factor is between 0.85 and 1.

16. The method as defined by claim 8, wherein the intraparticular porosity is less than 0.02 ml/g.

\* \* \* \* \*